United States Patent
Fehr et al.

(10) Patent No.: US 12,397,807 B2
(45) Date of Patent: Aug. 26, 2025

(54) SYSTEM AND METHOD FOR THE DRIVING MODE-DEPENDENT SETTING OF VEHICLE PROPERTIES OF A MOTORIZED TWO-WHEELED VEHICLE

(71) Applicant: Bayerische Motoren Werke Aktiengesellschaft, Munich (DE)

(72) Inventors: Florian Fehr, Grasbrunn (DE); Markus Hamm, Ismaning (DE); Andreas Lorch, Aresing (DE); Hans-Albert Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/021,874

(22) PCT Filed: Aug. 16, 2021

(86) PCT No.: PCT/EP2021/072683
§ 371 (c)(1),
(2) Date: Feb. 17, 2023

(87) PCT Pub. No.: WO2022/038075
PCT Pub. Date: Feb. 24, 2022

(65) Prior Publication Data
US 2024/0262371 A1    Aug. 8, 2024

(30) Foreign Application Priority Data
Aug. 18, 2020 (DE) ............ 10 2020 121 654.8

(51) Int. Cl.
*B60W 50/08* (2020.01)
*B60W 10/18* (2012.01)
*B62J 27/00* (2020.01)

(52) U.S. Cl.
CPC .......... *B60W 50/082* (2013.01); *B60W 10/18* (2013.01); *B62J 27/00* (2013.01); *B60W 2300/36* (2013.01)

(58) Field of Classification Search
CPC ............ B60W 50/082; B60W 10/18; B60W 2300/36; B60W 2050/0075;
(Continued)

(56) References Cited

U.S. PATENT DOCUMENTS

2012/0203424 A1* 8/2012 Filev ............ B60W 50/00
701/36
2013/0073156 A1 3/2013 Takeuchi et al.
(Continued)

FOREIGN PATENT DOCUMENTS

DE   10 2007 011 054 A1   9/2008
DE   10 2009 015 415 A1   9/2010
(Continued)

OTHER PUBLICATIONS

International Search Report (PCT/ISA/210) issued in PCT Application No. PCT/EP2021/072683 dated Nov. 5, 2021 with English translation (four (4) pages).
(Continued)

*Primary Examiner* — Anne Marie Antonucci
*Assistant Examiner* — Connor L Knight
(74) *Attorney, Agent, or Firm* — Crowell & Moring LLP

(57) ABSTRACT

A system and method for the driving mode-dependent setting of vehicle properties of a motorized two-wheeled vehicle. The system includes a first detection unit designed to detect a manually selected driving mode, a second detection unit designed to detect an active at least assisted driving operating mode, in particular active automated longitudinal control of the two-wheeled vehicle, and a control unit designed to, based on the selected driving mode, select
(Continued)

vehicle property settings that are defined depending on the detected driving operating mode.

11 Claims, 1 Drawing Sheet

(58) Field of Classification Search
CPC ......... B60W 2540/10; B60W 2540/12; B60W 2710/22; B60W 30/14; B60W 30/16; B60W 30/143; B62J 27/00
See application file for complete search history.

(56) References Cited

U.S. PATENT DOCUMENTS

| | | | | |
|---|---|---|---|---|
| 2015/0210290 | A1* | 7/2015 | Hemes | B60W 30/182 |
| | | | | 701/36 |
| 2016/0001781 | A1* | 1/2016 | Fung | G07C 9/37 |
| | | | | 701/36 |
| 2017/0080948 | A1* | 3/2017 | Lubbers | B60W 50/14 |
| 2017/0334454 | A1* | 11/2017 | Abe | B60W 50/0098 |
| 2018/0361972 | A1* | 12/2018 | Zagorski | B60W 30/182 |
| 2020/0047739 | A1* | 2/2020 | Grelaud | B60W 30/14 |
| 2020/0114903 | A1* | 4/2020 | Weissenmayer | B60W 30/02 |
| 2021/0171033 | A1* | 6/2021 | Pilkington | B60W 50/082 |
| 2021/0312725 | A1* | 10/2021 | Milton | G07C 5/008 |
| 2022/0274614 | A1* | 9/2022 | Singer | G06F 3/0488 |
| 2022/0281426 | A1* | 9/2022 | Grelaud | B60W 30/09 |

FOREIGN PATENT DOCUMENTS

| | | |
|---|---|---|
| DE | 10 2012 216 657 A1 | 3/2013 |
| DE | 10 2012 223 116 A1 | 7/2014 |
| DE | 10 2013 013 865 B3 | 2/2015 |
| DE | 10 2018 204 572 A1 | 9/2019 |
| DE | 10 2018 213 298 A1 | 2/2020 |

OTHER PUBLICATIONS

German-language Written Opinion (PCT/ISA/237) issued in PCT Application No. PCT/EP2021/072683 dated Nov. 5, 2021 (five (5) pages).

German-language Search Report issued in German Application No. 10 2020 121 654.8 dated Jan. 13, 2021 with partial English translation (11 pages).

* cited by examiner

SYSTEM AND METHOD FOR THE DRIVING MODE-DEPENDENT SETTING OF VEHICLE PROPERTIES OF A MOTORIZED TWO-WHEELED VEHICLE

CROSS REFERENCE TO RELATED APPLICATION

This application claims priority under 35 U.S.C. § 119 from German Patent Application No. 102020121654.8, filed Aug. 18, 2020, the entire disclosure of which is herein expressly incorporated by reference.

BACKGROUND AND SUMMARY OF THE INVENTION

The invention relates to a system and a correspondingly developed method for driving mode-dependent setting of vehicle properties of a motorized two-wheeler.

In recent years, the demand for motorized two-wheelers has risen sharply, wherein in addition to the classic motorcycle customers, more and more people who previously only drove a car are now buying a motorcycle. In particular, the newer customer base often attaches great importance to driver assistance systems when purchasing motorcycles. In order to meet this demand, the further development of motorcycles focuses on the integration of various driver assistance systems.

For example, motorcycles are already on the market having a so-called driving mode switch, with which the driver can choose between different driving modes (for example rain mode, road mode, sport mode, etc.). Depending on the driving mode, defined vehicle properties (for example engine characteristics, ABS assistance, traction control, spring damping, . . . ) are adjusted for the selected driving mode.

For example, some motorcycles have 5 selectable driving modes: When driving on a wet section of road and in difficult grip conditions, for example, the driver is relieved of load in "rain" mode by a particularly soft dosing behavior and responsiveness, but nevertheless has the full torque and power potential available. The electronic control system ASC (Automatic Stability Control) responds earlier than in the so-called "road" mode.

In "road" mode, the control systems are set to achieve optimum performance on dry roads. This driving mode provides a spontaneous and linear throttle response and combines good and smooth controllability with homogeneous torque build-up.

In "dynamic" mode, there is an even more spontaneous and direct throttle response, a restraint intervention of the ASC, and firm damping. The "enduro" mode is characterized by a soft throttle response, a restraining control intervention of the enduro ASC, optimum brake distribution and ideal ABS control behavior. An "enduro pro" mode is designed for operation with studded tires.

In addition to such driving mode switches, it is already known for motorcycles to be fitted with a speed control system with a distance control function (so-called ACC). Analogous to such systems in passenger cars, the so-called free driving mode is controlled to a predetermined target speed. If a vehicle ahead is detected at a lower speed, in the distance keeping mode the speed is automatically adjusted, taking into account a predetermined distance to the vehicle in front.

With the increasing number of driver assistance systems, situations may arise in which a coordination of the systems seems necessary.

The object of the invention is to provide a system and a corresponding method for motorized two-wheelers, which allow a coordinated setting of vehicle properties with regard to the use of various driver assistance systems.

This object is achieved by the features of the independent claims. Advantageous embodiments are described in the dependent claims. It should be noted that additional features of a claim dependent on an independent claim may form an independent invention without the features of the independent claim or only in combination with a subset of the features of the independent claim, which may be made the subject of an independent claim, a partition application or a subsequent application. This applies equally to technical lessons described in the description which may form an independent invention which is independent of the features of the independent claims.

The invention is based on the idea that increased safety support of the driver must always be ensured when driving in at least assisted driving mode.

On this basis, according to a first aspect according to the invention a system for driving mode-dependent setting of vehicle properties of a motorized two-wheeler is proposed, which includes the following elements:

- A first detection unit which is designed to detect a (manual) selected driving mode,
- a second detection unit which is designed to detect an active at least assisted driving mode, in particular to detect active automated longitudinal control of the two-wheeler, and
- a control unit which is designed to bring about defined settings of vehicle properties based on the selected driving mode and depending on the detected driving mode.

The different detection units may be formed separately or as one unit.

As already described at the start, the driving modes to be selected by the driver are embodied to adjust vehicle properties defined in the selected state (for example engine characteristics, ABS assistance, traction control, spring damping, . . . ) for the selected driving mode.

In the context of the document, the term "assisted driving mode" can be understood as driving with automated longitudinal or lateral control. The term "at least assisted driving" includes automated driving with any degree of automation. Exemplary degrees of automation are assisted, semi-automated, highly automated or fully automated driving. These degrees of automation were defined by the Federal Highway Research Institute (BASt) (see BASt publication "Forschung kompakt" issue 11/2012). During assisted driving the driver performs the longitudinal or lateral control permanently, while the system performs the respective other function within certain limits. In semi-automated driving (TAF), the system performs longitudinal and lateral control for a certain period of time and/or in specific situations, wherein the driver must constantly monitor the system as in assisted driving. In highly automated driving (HAF) the system performs the longitudinal and lateral control for a certain period of time without the driver having to monitor the system permanently; however, the driver must be able to take over driving the vehicle within a certain period of time. In fully automated driving (VAF), the system can automatically manage driving in all situations for a specific application; no driver is required for this application. The aforementioned four degrees of automation according to the definition of the BASt correspond to SAE levels 1 to 4 of the standard SAE J3016 (SAE—Society of Automotive Engineering).

Since the use of various assistance systems, in particular the safety control systems, is of increased importance, the control unit is advantageously further designed to bring about defined settings of safety systems depending on the detected driving mode, in particular such that as high a level of support as possible is achieved at least in assisted driving mode.

For this purpose, the control unit is advantageously designed to bring about such defined settings of vehicle properties depending on the detected driving operation that in the event of detected at least assisted driving, in particular in the case of active automated longitudinal control, the supporting effect of the safety systems is greater than when at least assisted driving mode is not detected.

In a further advantageous embodiment of the system, it is provided that the control unit is designed, regardless of the detected selected driving mode and in the case of detected automated longitudinal control, to bring about the setting of defined safety systems with a high, in particular maximum supporting effect. In other words, the control unit is designed, regardless of the manually selected driving mode (which usually triggers defined settings of vehicle properties), when activating a longitudinal control system (for example a so-called ACC system) to bring about settings of vehicle properties suitable for the ACC mode, wherein the associated settings should lead to increased support of the driver or should increase driving safety. In the sense of a setting of vehicle properties, a modified setting of at least one of the following safety control systems can be advantageously brought about depending on the detected driving mode:

anti-lock braking system,
dynamic traction control system (DTC),
adaptive chassis control system.

In a further embodiment of the invention it may advantageously be provided that the system comprises a third detection unit designed to detect a manual override of the active at least assisted driving mode. In addition, in the active but manually overridden driving mode (regardless of the selected driving mode) the control unit is designed to maintain the defined settings for the assisted driving mode brought about depending on the detected driving mode. In other words, in the case of an override by the driver (for example an ACC system is overridden by the driver by accelerating) the setting of the control systems adjusted for assisted driving can be maintained.

Alternatively, the system according to the invention may also be designed in such a way that in active but manually overridden assisted driving mode, depending on the (pre-)set driving mode, the settings of the vehicle properties may be adjusted, in particular in such a way that the settings of the vehicle properties defined for the selected driving mode are (re)established or brought about.

In addition or alternative to the possible configuration in the event of a temporary override of the active assisted driving mode, in a further advantageous embodiment of the invention it may be provided that the system comprises a fourth detection unit, which is designed to detect an interruption or deactivation of the active at least assisted driving mode by manual operation of the brake, and the control unit is designed, in the event of interruption or deactivation of at least assisted driving by manual operation of the brake, to (initially) maintain the settings brought about by the previously detected assisted driving. In particular, the control unit can be designed to maintain the defined settings brought about depending on the previously detected assisted driving mode for a defined time or until the occurrence of a defined event, in particular until the end of braking, i.e. until the brake has been released. In other words, therefore in the event of manual interruption or deactivation of the assisted driving mode (for example by operating the brake), the settings of the vehicle properties, in particular an ABS function, are maintained until the end of braking and only then adjusted for the driving mode setting preset by the driver. Thus, the driver still receives the full control system support during the entire braking period and for example is not surprised by a lifting rear wheel—by switching the ABS mode—because a very sporty driving mode is selected.

In a further embodiment of the invention, it may be provided that an existing driving mode display displays the assisted driving mode separately, i.e. an adjusted driving mode display is shown during the active assisted driving mode.

Analogous to the system according to the invention, according to a further aspect of the invention a method according to the invention for driving mode-dependent setting of vehicle properties of a motorized two-wheeler with the following steps is proposed:

Detection of a (manually) selected driving mode,
Detection of an active at least assisted driving mode, in particular active automated longitudinal control of the two-wheeler, and
Bringing about defined settings of vehicle properties based on the selected driving mode and depending on the detected driving mode.

The above embodiments of the system according to the invention according to the first aspect of the invention apply in a corresponding manner to the method according to the invention according to the second aspect of the invention, as well as to a correspondingly designed driver assistance system. Advantageous exemplary embodiments of the method according to the invention and the assistance system which are not explicitly described at this point and in the claims correspond to the advantageous exemplary embodiments of the system according to the invention described above or described in the claims.

The invention is described below on the basis of an exemplary embodiment with the aid of the attached drawings.

DETAILED DESCRIPTION

Figure 1:
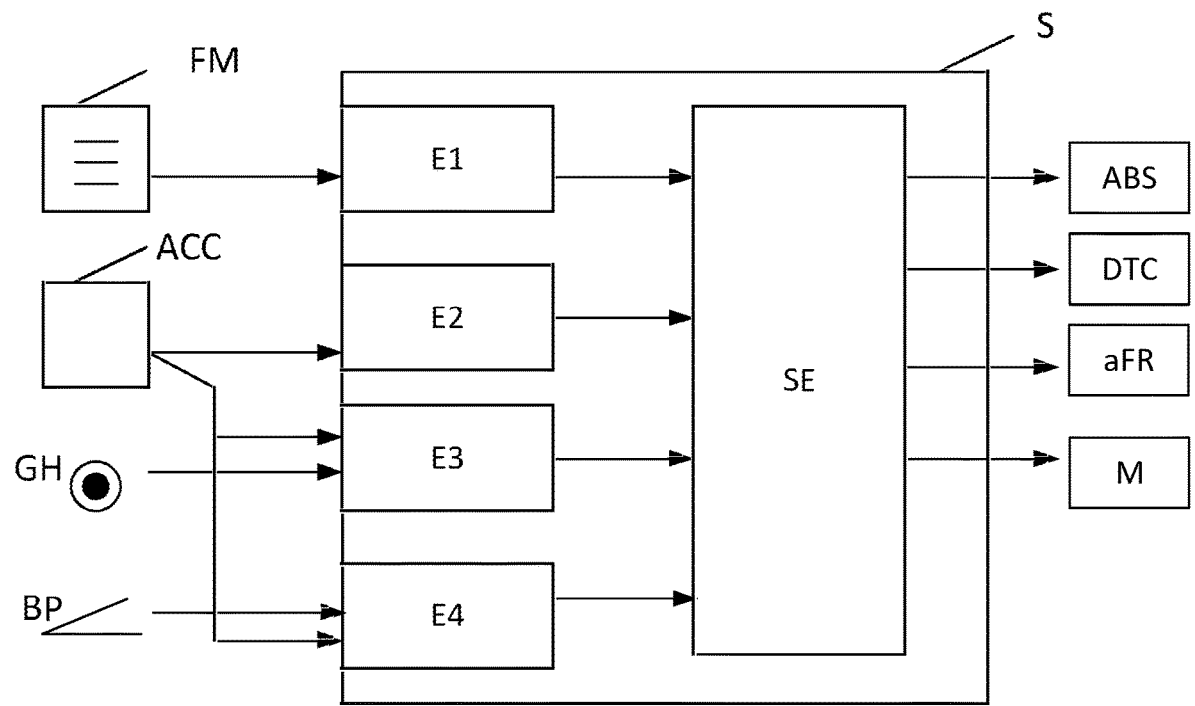
FIG. 1 shows a simplified exemplary embodiment of a system according to the invention for driving mode-dependent setting of vehicle properties of a motorized two-wheeler.

In detail, FIG. 1 shows a system S integrated into a motorcycle for driving mode-dependent setting of vehicle properties of the motorcycle, which comprises four detection units E1-E4 and one control unit SE. The system S is integrated into the entire control electronics of the motorcycle in such a way that it can receive various signals from relevant components and send signals to other control units or specific actuators. The different detection units E1-E4 can be in the form of individual components of the system or combined in a central detection unit.

The first detection unit E1 integrated into the system S is designed to detect a driving mode (for example rain mode, road mode, sport mode, etc.) selected by the rider of the motorcycle by means of a control element FM and to pass this information on to the control unit SE.

The second detection unit E2 integrated into the system S is designed to detect an active assisted longitudinal control mode of the motorcycle (for example, a speed control system with a distance keeping function) ACC and to transmit corresponding information to the control unit SE.

The third detection unit E3 is designed to detect a manual override of the active cruise control system ACC. For this purpose, signals of the cruise control system ACC and a throttle GH are evaluated and an override of the active cruise control system ACC is detected when the throttle GH is operated when the ACC is active. The third detection unit E3 transmits the detected information concerning an override of the cruise control system ACC to the control unit SE. As an alternative to this embodiment, the information about the override of the cruise control system can also be transmitted directly from the cruise control system ACC and detected.

The fourth detection unit E4 is designed to detect an interruption or deactivation of the active cruise control system ACC by manual operation of the brake BP. For this purpose, signals from the cruise control system ACC and the brake BP are evaluated and deactivation or interruption of the active cruise control system ACC is detected when the brake pedal BP is manually operated while the ACC is active. The fourth detection unit E4 transmits a signal dependent on the detected interruption or deactivation state of the cruise control system ACC to the control unit SE. As an alternative to this embodiment, the information about the interruption or deactivation of the cruise control system by manual brake operation can also be transmitted directly by the ACC cruise control system and detected.

The control unit SE is designed to bring about defined settings of vehicle properties based on the information detected by the detection units E1-E4 and depending on the detected driving mode. In particular, the control unit SE brings about the following settings of vehicle properties depending on the detected states:

1 There is no ACC speed control active:
The control unit SE brings about, based on the selected or preset driving mode, a driving mode-dependent setting of the engine characteristics M, the anti-lock braking system ABS, the dynamic traction control system DTC and the adaptive chassis control system aFR.

2. The cruise control ACC is active and is not overridden:
Based on the selected or preset driving mode, the control unit SE brings about a driving mode-dependent setting of the engine characteristics M or maintains the previously brought about driving mode-dependent setting of the engine characteristics M. However, regardless of the selected driving mode, in the case of the ABS, OTC and aFR safety control systems the control unit SE may bring about such an adjustment of the setting of these ABS, OTC and aFR safety systems that they are operated in a state with a higher level of support (than in the case of an inactive ACC), in particular with a maximum supporting effect.

3. The cruise control ACC is active, but is temporarily overridden by operating the throttle GH:
The control unit SE brings about a driving mode-dependent setting of the engine characteristics M based on the selected or preset driving mode or maintains the previously brought about driving mode-dependent setting of the engine characteristics M. Regardless of the selected driving mode, the control unit SE causes maintenance of the settings of the ABS, OTC and aFR safety control systems which are brought about when the ACC cruise control system is activated (maximum supporting effect).

4. The active cruise control ACC is interrupted or deactivated by manual operation of the brake BP:
The control unit SE brings about a driving mode-dependent setting of the engine characteristics M based on the selected or preset driving mode, or maintains the previously brought about driving mode-dependent setting of the engine characteristics M. As long as the brake BP is operated manually, regardless of the selected driving mode the control unit SE causes maintenance of the settings of the safety systems ABS, OTC and aFR (maximum supporting effect) brought about when the cruise control system is activated. As soon as the brake BP is released, the control unit SE brings about a driving mode-dependent setting of the safety control systems ABS, OTC and aFR with a driving mode-dependent supporting effect.

Figure 2:
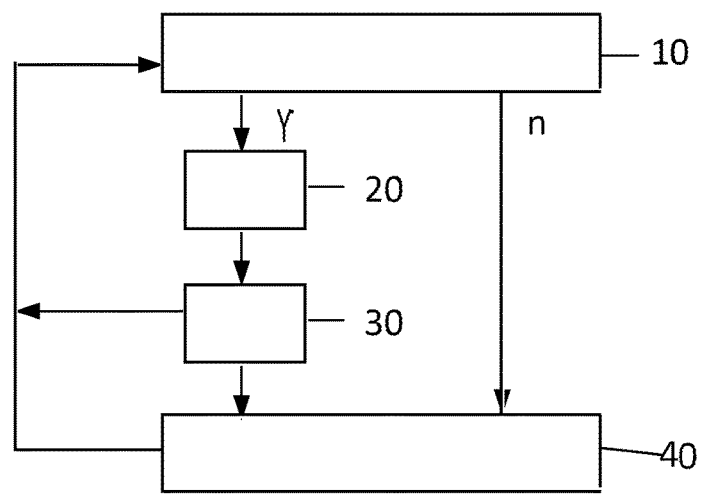
FIG. 2 shows a simplified exemplary embodiment of a method according to the invention for driving mode-dependent setting of vehicle properties of a motorized two-wheeler.

An example of the method according to the invention for driving mode-dependent setting of vehicle properties of a motorized two-wheeler is explained on the basis of FIG. 2.

First, in step 10 a check is conducted as to whether an assisting driving mode, in particular an assisting longitudinal control mode, of the two-wheeler is active. If this is not the case, driving mode-dependent settings of vehicle properties, especially the engine characteristics and defined safety systems, are carried out in step 40 depending on the preset or manually selected driving mode.

However, if it is detected in step 10 that an assisting longitudinal control mode of the two-wheeler is active, the method moves on to step 20 and defined settings of safety systems are brought about with regard to an improved supporting effect regardless of the current driving mode. The settings of the engine characteristics are not changed.

After the adjustment of the setting of the safety systems has been brought about, in the next step 30 a query is conducted as to whether manual operation of the brake leading to interruption or deactivation of cruise control has been detected. If this is the case, the method remains in step 30—without interfering with the current settings of the vehicle properties—until release of the brake pedal is detected. On detecting releasing of the brake pedal, driving mode-dependent settings of vehicle properties, in particular of the engine characteristics and defined safety systems, are carried out in step 40 depending on the preset or manually selected·driving mode. The step is then changed to step 10.

However, if no manual operation of the brake is detected in step 30, the method jumps back to step 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for driving mode-dependent setting of vehicle system settings for a motorized two-wheeler, comprising:
    a first detection unit configured to detect a selected driving mode from among a plurality of driving modes including a sport mode;
    a second detection unit configured to detect an active assisted driving mode for automated longitudinal control; and
    a control unit configured to:

select predefined settings of one or more vehicle systems based on the selected driving mode and on the detected active assisted driving mode, and cause the one or more vehicle systems to operate according to the selected predefined settings.

2. The system of claim 1, wherein the vehicle systems include safety systems.

3. The system of claim 2, wherein the selection of the predefined settings is such that, when the active assisted driving mode is detected, a supporting effect of the safety systems is greater than when the active assisted driving mode is not detected.

4. The system of claim 3, wherein the selection of the predefined settings is such that the safety systems are operated with maximum supporting effect, regardless of the detected selected driving mode, when the active automated longitudinal control is detected.

5. The system of claim 4, wherein the safety systems include: an anti-lock braking system (ABS), a dynamic traction control system (DTC), and an adaptive chassis control system (aFR).

6. The system of claim 1, further comprising:
a third detection unit configured to detect a manual override of the active assisted driving mode, wherein the control unit is configured to, when the manual override is detected, maintain the predefined settings as first predefined settings associated with the detected active assisted driving mode, regardless of the selected driving mode.

7. The system of claim 6, further comprising:
a fourth detection unit configured to detect an interruption or deactivation of the active assisted driving mode by manual operation of a brake, wherein the control unit is configured to, when the interruption or detection is detected, maintain the predefined settings as second predefined settings associated with the selected driving mode and the detected active assisted driving mode.

8. The system of claim 7, wherein the control unit is configured to maintain the second predefined settings for a predefined time or until the occurrence of a predefined event.

9. The system of claim 8, wherein the predefined event is an end of the manual operation of the brake.

10. The system of claim 1, further comprising:
a display unit configured to provide a driving mode-dependent display based on the selected driving mode, wherein different driving mode-dependent displays are displayed depending on the detected active assisted driving mode.

11. A method for driving mode-dependent setting of vehicle system settings for a motorized two-wheeler, comprising:
detecting of a manually selected driving mode from among a plurality of driving modes including a sport mode;

detecting an active assisted driving mode for automated longitudinal control;

selecting, by a control unit, predefined settings of one or more vehicle systems based on the selected driving mode and on the detected active assisted driving mode; and causing, by the control unit, the one or more vehicle systems to operate according to the selected predefined settings.

* * * * *